(12) United States Patent
Gandham

(10) Patent No.: US 7,961,691 B2
(45) Date of Patent: Jun. 14, 2011

(54) TIMESLOT DURATION IN TDMA-BASED MAC FOR VOIP OVER WIRELESS

(75) Inventor: Shashidhar R. Gandham, Sunrise, FL (US)

(73) Assignee: XG Technology, Inc., Sarasota, FL (US)

(*) Notice: Subject to any disclaimer, the term of this patent is extended or adjusted under 35 U.S.C. 154(b) by 784 days.

(21) Appl. No.: 12/070,815

(22) Filed: Feb. 21, 2008

(65) Prior Publication Data
US 2008/0205373 A1    Aug. 28, 2008

Related U.S. Application Data

(60) Provisional application No. 60/903,282, filed on Feb. 23, 2007.

(51) Int. Cl.
*H04W 4/00* (2009.01)

(52) U.S. Cl. ......... 370/338; 370/348; 370/447; 370/352

(58) Field of Classification Search .................. None
See application file for complete search history.

(56) References Cited

U.S. PATENT DOCUMENTS

| | | | |
|---|---|---|---|
| 6,577,862 B1* | 6/2003 | Davidson et al. | 370/433 |
| 6,847,635 B1 | 1/2005 | Beser | |
| 7,756,105 B1* | 7/2010 | Khouw et al. | 370/352 |
| 7,826,475 B2* | 11/2010 | Lee et al. | 370/445 |
| 2004/0213191 A1* | 10/2004 | Lee | 370/338 |
| 2004/0218620 A1* | 11/2004 | Palm et al. | 370/445 |
| 2005/0220131 A1* | 10/2005 | Ginzburg et al. | 370/432 |
| 2005/0271076 A1 | 12/2005 | Ganti et al. | |
| 2006/0029073 A1* | 2/2006 | Cervello et al. | 370/389 |
| 2006/0050742 A1 | 3/2006 | Grandhi et al. | |
| 2006/0291430 A1* | 12/2006 | Putzolu et al. | 370/335 |
| 2008/0171550 A1* | 7/2008 | Zhao | 455/445 |

* cited by examiner

*Primary Examiner* — Ian N Moore
*Assistant Examiner* — Eric Wang
(74) *Attorney, Agent, or Firm* — Dennis L. Cook, Esq.

(57) ABSTRACT

What is described is an approach to assigning timeslots of appropriate duration when using a TDMA based MAC protocol for forwarding VOIP traffic. It is known that a typical user speaks only 35% of the time in a voice session. Existing VOIP systems exploit this fact and reduce the amount of data generated by employing Voice Activity Detection (VAD) algorithms. The packets generated when a user is silent are shorter than the packets generated when a user is speaking. Hence there is a need to assign timeslots of different duration based on user speech activity. When the user is speaking we assign an Active Speech Timeslot (AST). When the user is listening a Silent Speech Timeslot (SST) that is long enough to transmit packets generated by a Comfort Noise Generator is assigned.

3 Claims, 1 Drawing Sheet

TIMESLOT DURATION IN TDMA-BASED MAC FOR VOIP OVER WIRELESS

CROSS-REFERENCE TO RELATED APPLICATION

The present application claims the benefit of previously filed co-pending Provisional Patent Application Ser. No. 60/903,282.

FIELD OF THE INVENTION

This invention addresses the need to transport high bit-rate data and voice to multiple users over wired and wireless means. Specifically, this disclosure describes a new method to determine timeslot duration in a TDMA based MAC protocol for use in VOIP systems.

BACKGROUND OF THE INVENTION

Modulation is the fundamental process in any communication system. It is a process to impress a message (voice, image, data, etc.) on to a carrier wave for transmission. A band-limited range of frequencies that comprise the message (baseband) is translated to a higher range of frequencies. The band-limited message is preserved, i.e., every frequency in that message is scaled by a constant value. The three key parameters of a carrier wave are its amplitude, its phase and its frequency, all of which can be modified in accordance with an information signal to obtain the modulated signal.

There are various shapes and forms of modulators. For example conventional Amplitude Modulation uses a number of different techniques for modulating the amplitude of the carrier in accordance with the information signal. These techniques have been described in detail in "Modern Analog and Digital Communication Systems" by B. P. Lathi. Similarly conventional Frequency/Phase Modulation uses a number of different methods described in a number of textbooks. In all these techniques, carrier (which is a high frequency sinusoidal signal) characteristics (either amplitude, frequency, phase or combination of these) are changed in accordance with the data (or information signal). Thus there have been two major components of a modulated signal. One is the information-carrying signal and the other is the high frequency carrier.

Communication systems that have emerged in recent years include mono-pulse and Ultra-Wide Band communication systems. The problem with these systems is that all mono-pulse or Ultra-Wide Band communications systems form Power Spectrum Densities that tend to span very wide swaths of the radio spectrum. For instance the FCC has conditionally allowed limited power use of UWB from 3.2 GHz to 10 GHz. These systems must make use of very wide sections of radio spectrum because the transmit power in any narrow section of the spectrum is very low. Generally any 4 KHz section of the affected spectrum will contain no more than −42 dbm of UWB spectral power. Correlating receivers are used to "gather" such very wide spectral power and concentrate it into detectable pulses. Interfering signals are problematic. Since the communication system is receiving energy over a very wide spectrum, any interfering signal in that spectrum must be tolerated and mitigated within the receiver. Many schemes exist to mitigate the interference. Some of these include selective blocking of certain sections of spectrum so as not to hear the interferer, OFDM schemes that send redundant copies of the information in the hope that at least one copy will get through interference, and other more exotic schemes that require sophisticated DSP algorithms to perform advanced filtering. In addition, UWB systems have somewhat of a "bad reputation" because they at least have the potential to cause interference. A heated discourse has gone on for years over the potential that UWB systems can cause interference to legacy spectrum users.

Tri-State Integer Cycle Modulation (TICM) and other Integer Cycle Modulation techniques, which have now become known by its commercial designation, xMax, were designed by xG Technology, Inc., the Assignee of this application to help alleviate this massive and growing problem. Its signal characteristics are such that absolute minimal sideband energy is generated during modulation but that its power spectrum density is quite wide relative to the information rate applied. Also, a narrower section of the power spectrum output can be used to represent the same information. The method of determining timeslot duration in a MAC protocol described in this disclosure is applicable to any VOIP system but is described in the preferred embodiment below as applied to these types of integer cycle and pulse modulation systems in VOIP networks.

BRIEF SUMMARY OF THE INVENTION

The invention disclosed in this application uses any integer cycle, impulse, or other type modulation used in VOIP systems and more particularly, in the preferred embodiment, is designed to work with a method of modulation named Tri-State Integer Cycle Modulation (TICM) which has been previously disclosed in U.S. Pat. No. 7,003,047 issued Feb. 21, 2006 and is now known by its commercial designation, xMax. This new wireless physical layer technology developed by xG Technology Inc., referred to as xMAX, enables extremely low power omnidirectional transmissions to be received in a wide area. Using xMAX, significant bandwidth can be made available for supporting various wireless applications. Voice Over IP (VOIP) based cellular services are now being developed using xMAX. In xMAX-based cellular networks both the base station and the handsets will be equipped with an xMAX transceiver. A mobile device (xMAX handset) in such a network will be free to move in the radius covered by an xMAX base station.

For a fuller understanding of the nature and objects of the invention, reference should be made to the following detailed description taken in connection with the accompanying drawings.

DESCRIPTION OF THE DRAWINGS

For a fuller understanding of the nature and objects of the invention, reference should be made to the accompanying drawings, in which.

DETAILED DESCRIPTION OF THE INVENTION

The new wireless physical layer technology developed by xG Technology Inc., referred to as xMAX, enables extremely low power omnidirectional transmissions to be received in a wide area Using xMAX, significant bandwidth can be made available for supporting various wireless applications. Voice Over IP (VOIP) based cellular services are now being developed using xMAX. In xMAX-based cellular networks both the base station and the handsets will be equipped with an xMAX transceiver. A mobile device (xMAX handset) in such a network will be free to move in the radius covered by an xMAX base station.

Figure 1:
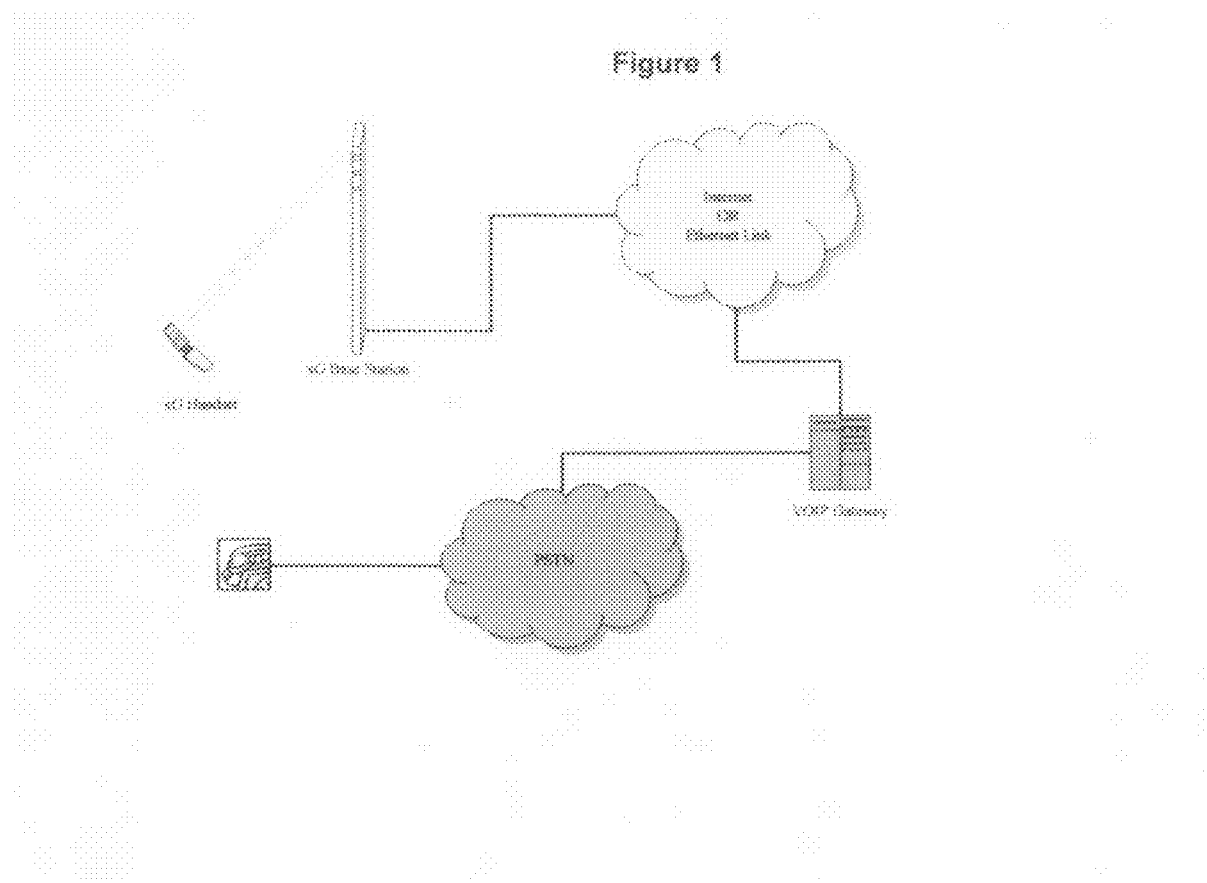
FIG. 1 is a representation of an xMax deployment scenario.

In VOIP-based cellular networks xMAX handsets (or mobile nodes) will be equipped with the complete VOIP stack. The xMAX base station will be connected to the Internet through an Ethernet port. The mobile nodes will communicate with the xMAX base station to reach a VOIP gateway. FIG. 1 depicts the deployment scenario. To enable communication between an xMAX handset and an xMAX base station we need a MAC (Medium Access Control) protocol that is optimized for VOIP traffic.

Voice Over IP (VOIP) has been fairly successful in supporting voice calls in IP (Internet Protocol) networks. One of the main reasons behind the success of VOIP as an alternative to PSTN (Public Switched Telephone Networks) is the ability to deploy VOIP systems at relatively low cost. In addition, VOIP based voice services can be provided to the end user at fraction of the cost as compared to PSTN. An interesting extension of VOIP is to support it over wireless networks as shown in FIG. 1. VOIP over wireless enables rolling out cellular network services in a cost effective manner.

As quality of a VOIP session is very sensitive to jitter contention-based MAC protocols like Carrier Sense Multiple Access with Collision Avoidance (CSMA/CA) and 802.11(b) are not suitable. Details of both the techniques can be found in Andrew S. Tanenbaum, Computer Networks $4^{th}$ Edition, *Prentice Hall* and LAN MAN Standards Committee of the IEEE Computer Society. Wireless LAN medium access control (MAC) and physical layer (PHY) specification. *IEEE, New York; NY, USA, IEEE Std.* 802.11, 1997. It is well known that no jitter is introduced on using contention-free MAC protocols like TDMA (Time Division Multiple Access). Hence, we consider TDMA-based MAC protocols for VOIP over wireless.

In a typical voice conversation, as per Olivier Hersent, Jean-Pierre Petit and David Gurle, Beyond VOIP Protocols: Understanding Voice Technology and Networking Techniques for IP Telephony *Wiley* 2005, a typical user speaks only 35% of the time in a voice session. A conservative estimate is that each user speaks only during 50% of voice session.

Existing VOIP systems exploit this fact and reduce the amount of data generated by employing Voice Activity Detection (VAD) algorithms. During silence periods a Comfort Noise Generator (CNG) is used generate data (at a low rate) corresponding to the background noise at the speaker's end. For example, G.723.1 generates data at 1.07 kbps during periods of silence. The background noise, when played back, ensures that the listener gets a feel for the speaker's environment. In addition the listener can distinguish between the speaker being silent and the connection being lost.

When using G.723.1 codec the IP packet during active speech consists of 60 bytes. During silence periods the IP packet is 44 bytes long. When header compression techniques are employed we have IP packets of length 22 bytes and 6 bytes during active speech and silence respectively. If the timeslot duration is fixed to accommodate the maximum length of the IP packet then during silence periods we have a channel utilization of either 73.33% (no header compression) or 27.27% (header compression).

The duration of the timeslot has to be accurately determined in order to support the maximum number of simultaneous VOIP sessions per base station. By assigning timeslots of appropriate duration one can ensure that the channel utilization is 100%. However, we do not have a priori knowledge of the user speech activity. In this patent we describe two methods for assigning timeslots of appropriate durations. The first one uses information from VAD system at the MAC sub layer to decide the duration of the timeslot. The second method can be used when information from the VAD system in not available.

The following discussion is based on xMAC, which is a combination of TDMA and CSMA. A detailed description of xMAC can be found in the patent application titled Heterogeneous MAC Protocol for Forwarding VOIP Traffic on Wireless Networks, application serial number (not yet assigned), invented by Shashidhar Gandham, the inventor of this application. In xMAC voice packets are forwarded in assigned timeslots. Other IP packets are forwarded using CSMA.

xMAC is a heterogeneous MAC protocol for supporting voice and data applications on xMAX networks. xMAC is a combination of TDMA and CSMA/CA. Guaranteed timeslots are assigned for each mobile device to forward voice traffic. To forward signaling traffic and application data, handsets contend for channel access. Signaling traffic is assigned a higher priority over application data in gaining access to the channel.

Figure 2:
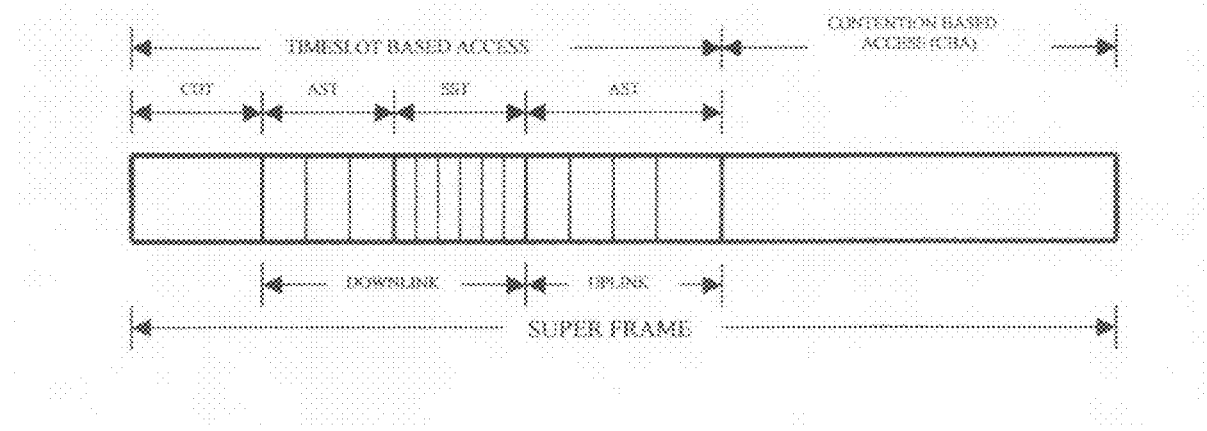
FIG. 2 is a representation of a super-frame format in xMAC.

In xMAC the time domain is sliced into equal intervals of time. Each time interval is referred to as a super-frame as shown in FIG. 2. The initial part of the super-frame is reserved for Timeslot Based Access (TBA). The remaining part of the super-frame is meant for Contention Based Access (CBA). The focus of this disclosure is on TBA.

The duration of TBA depends on the number of mobiles involved in a voice session and the number of packets the base station has to forward to the mobile nodes. The TBA is subdivided into three parts: the (1) Control Data Timeslot (CDT), (2) downlink timeslots, and (3) uplink timeslots.

The base station transmits control information regarding the current super frame in the CDT. The base station assigns uplink and downlink timeslots and announces them in the CDT. The Base Station can change the timeslot assignment of the handsets from one super-frame to the other. Downlink and Uplink timeslots are used to transmit and receive IP packets with RTP payload. RTP is used to carry the voice packets. More information on RTP can be found in RTP: A Transport Protocol for Real-Time Applications (RFC 1889). The base station forwards voice packets to the mobile nodes in downlink timeslots. Mobile nodes forward voice packets to the base station in uplink timeslots.

Two types of downlink timeslots are defined: (1) Active Speech Timeslots (AST) and (2) Silence Speech Timeslots (SST). An AST is long enough to transmit a packet corresponding to the speech duration of the user. Similarly a SST is long enough to transmit a packet that carries comfort noise information. Before the start of every super-frame the base station decides whether an AST or an SST is required to transmit a packet. The decision is based on the size of the packet the base station has to transmit to a handset in the current super-frame. The base station prepares the downlink schedule before the beginning of every super-frame. The timeslot assignments that changed in comparison with the previous super-frame are announced in the CDT.

For uplink transmissions from a mobile the base station has no means of knowing if the next transmission from the mobile node will correspond to an active speech or period of silence. As a result, the base station by itself cannot decide about assigning an AST or an SST. However, the handset can inform the base station about the type timeslot it needs to transmit its next packet. A VAD system in the handsets VOIP stack can be used to determine if the next packet corresponds to speech or silence.

Every packet transmitted by the handset will have a 1-bit timeslot type field indicating the type of packet that the handset has to transmit in the next super-frame. If the bit is set to 1 it indicates that the handset needs an AST. If not the handset needs a SST. Using this information the base station can prepare the uplink schedule for the next super-frame.

If the information from the VAD system is not available at the MAC layer then the type of timeslot needed will be known only when a packet is queued in the MAC sub layer. In such a scenario we have two cases to be considered.

In the first case, the handset is assigned an AST and the current packet queued corresponds to comfort noise (shorter packet). We can safely transmit the current packet and use the 1-bit timeslot type field to inform the base station that in the next super-frame a SST is required.

In the second case, the handset is assigned a SST and the current packet queued corresponds to active speech (longer packet). We know that a SST is not long enough to transmit the current packet. One can buffer the packet until the next super-frame and inform the base station that it needs an AST in the next super-frame. However, this approach increases the latency of every following packet by the duration of the super-frame. Alternatively, the current packet can be transmitted during the CBA.

Thus in this patent what is disclosed is an approach to assign timeslots of appropriate duration when using a TDMA based MAC protocol for forwarding VOIP traffic. It is known that a typical user speaks only 35% of the time in a voice session. Existing VOIP systems exploit this fact and reduce the amount of data generated by employing Voice Activity Detection (VAD) algorithms. The packets generated when a user is silent are shorter than the packets generated when a user is speaking. Hence there is a need to assign timeslots of different duration based on user speech activity. When the user is speaking we assign an Active Speech Timeslot (AST). When the user is listening a Silent Speech Timeslot (SST) that is long enough to transmit packets generated by a Comfort Noise Generator is assigned. I also describe two methods to determine if the handset needs an AST or a SST. The first method needs information from a VAD system and is used in the handset. Whereas, the second system does not need any input from a VAD.

Since certain changes may be made in the above described method of determining timeslot duration in a MAC protocol without departing from the scope of the invention herein involved, it is intended that all matter contained in the description thereof or shown in the accompanying figures shall be interpreted as illustrative and not in a limiting sense.

What is claimed is:

1. A system utilizing a medium access control protocol that combines contention-free and contention-based medium access control protocols into a heterogeneous medium access control protocol used for forwarding Internet Protocol packets containing voice traffic, signaling traffic, and application data traffic between a base station and mobile nodes in a voice over internet protocol system on a wireless network that is capable of determining timeslot duration, said system comprising:

said base station in electrical communication with the Internet;

said one or more mobile station in wireless electrical communication with said base station;

said base station and said one or more mobile nodes each having said medium access control protocol;

wherein said medium access control protocol having super-frames of equal intervals of time;

each of said super-frames made up of an initial timeslot for contention-free timeslot based access said voice traffic and a remainder timeslot for contention-based access said signaling traffic and said application data traffic;

said base station capable of dynamically determining said time duration of said super-frames and said initial timeslot for contention-free timeslot based access based on a packetization interval determined by the duration of the voice traffic in said Internet Protocol packets;

said initial timeslot for said contention-free timeslot based access is divided into a control data timeslot, a downlink timeslot, and an uplink timeslot wherein the control data timeslot contains information regarding a current super-frame of said super-frames and said one or more mobile nodes are all capable of receiving said information during said control data timeslot in each of said super-frames;

said downlink timeslot being either an active speech timeslot that is long enough to transmit said Internet Protocol packet corresponding to a length of speech duration of a user or a silence speech timeslot that is long enough to transmit said Internet Protocol packet containing comfort noise information;

said base station making a determination of whether said active speech timeslot or said silent speech timeslot is required based on what has to be transmitted to said mobile node in each of said super-frames wherein said base station prepares a downlink schedule before the beginning of said current super-frame with the determination of any change from a previous super-frame being announced in said control data timeslot;

said mobile node having a voice activity detection algorithm such that each Internet Protocol packet transmitted by said mobile node has a 1-bit timeslot type field indicating the type of Internet Protocol packet that said mobile node has to transmit in the next super-frame and wherein if the 1-bit timeslot type field is set to one it indicates that a handset needs said active speech timeslot and if the 1-bit timeslot type field is set to zero it indicates that said mobile node needs said silence speech timeslot and wherein using this information said base station can prepare an uplink schedule for the next super-frame;

said remainder timeslot for contention-based access also containing control messages transmitted between said base station and said one or more mobile nodes when said one or more mobile nodes join or leave the wireless network or initiate a voice session;

said one or more mobile nodes using carrier sense multiple access with collision avoidance with binary exponential back off contention-based access; and, wherein said control messages are assigned a highest priority, said signaling traffic are assigned a lower priority, and said data application messages are assigned a lowest priority.

2. The medium access control protocol that is capable of determining said timeslot duration of said system claim 1 wherein if information is not available from said voice activity detection algorithm said mobile node is assigned said active speech timeslot and if said Internet Protocol packet to be currently transmitted is said silence speech timeslot it is transmitted and the 1-bit timeslot type field is used to inform said base station that said silence speech timeslot is required in the next super-frame and if said mobile node is assigned said silence speech timeslot and said current Internet Protocol packet is said active speech timeslot then said current Internet Protocol packet is buffered until the next super-frame and said base station is notified that said base station needs to transmit an active speech timeslot in the next super-frame.

3. The medium access control protocol that is capable of determining said timeslot duration of said system claim 1 wherein if information is not available from said voice activity detection algorithm said current Internet Protocol packet is transmitted during said remainder timeslot for contention-based access.

* * * * *